United States Patent
Dokku et al.

(10) Patent No.: US 11,974,253 B2
(45) Date of Patent: Apr. 30, 2024

(54) SMART RESOURCE MANAGEMENT FOR LOW LATENCY USE CASE

(71) Applicant: QUALCOMM Incorporated, San Diego, CA (US)

(72) Inventors: Vamsi Krishna Dokku, San Diego, CA (US); Abhinav Kannan, Longmont, CO (US); Andrew Mitchell Siemon, San Diego, CA (US); Raul Martinez, San Diego, CA (US); Sitaramanjaneyulu Kanamarlapudi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/240,245

(22) Filed: Apr. 26, 2021

(65) Prior Publication Data
US 2022/0346063 A1    Oct. 27, 2022

(51) Int. Cl.
*H04W 72/02* (2009.01)
*H04W 4/40* (2018.01)
*H04W 28/26* (2009.01)

(52) U.S. Cl.
CPC .............. *H04W 72/02* (2013.01); *H04W 4/40* (2018.02); *H04W 28/26* (2013.01)

(58) Field of Classification Search
CPC ........ H04W 72/02; H04W 4/40; H04W 28/26
See application file for complete search history.

(56) References Cited

U.S. PATENT DOCUMENTS

| | | | |
|---|---|---|---|
| 2011/0009100 A1* | 1/2011 | Oyane ................... | H04W 72/56 455/414.1 |
| 2014/0122689 A1* | 5/2014 | Park ................... | H04L 49/9068 709/224 |
| 2018/0279259 A1* | 9/2018 | Gulati ................... | H04W 24/02 |
| 2019/0188030 A1* | 6/2019 | Qiao ....................... | G06F 9/485 |
| 2021/0067970 A1* | 3/2021 | Huang ................ | H04W 12/108 |
| 2021/0099976 A1 | 4/2021 | Mueck et al. | |
| 2021/0247762 A1* | 8/2021 | Park ...................... | G06K 9/6288 |
| 2022/0161744 A1* | 5/2022 | Vangoethem ........ | B60R 16/0231 |

FOREIGN PATENT DOCUMENTS

| | | |
|---|---|---|
| WO | 2018175822 A1 | 9/2018 |
| WO | 2019236424 A1 | 12/2019 |
| WO | 2020006110 A1 | 1/2020 |

OTHER PUBLICATIONS

International Search Report and Written Opinion—PCT/US2022/071777—ISA/EPO—Jul. 27, 2022.

* cited by examiner

*Primary Examiner* — Won Tae C Kim
(74) *Attorney, Agent, or Firm* — Patterson + Sheridan, L.L.P.

(57) ABSTRACT

Certain aspects of the present disclosure relate to wireless communications, and more particularly, to techniques for determining a current status of cellular vehicle to everything (CV2X) traffic and then allocating application processor resources for a CV2X call based on the current status of the CV2X traffic. The allocating may include reserving the application processor resources for the CV2X call when the CV2X traffic is active and releasing the reserved application processor resources when there is no CV2X traffic.

26 Claims, 17 Drawing Sheets

700

702
DETERMINE, BY AN APPLICATION PROCESSOR, A CURRENT STATUS OF CELLULAR VEHICLE TO EVERYTHING (CV2X) TRAFFIC

704
ALLOCATE, BY THE APPLICATION PROCESSOR, AN AMOUNT OF APPLICATION PROCESSOR RESOURCES FOR A CV2X CALL, BASED ON THE CURRENT STATUS OF THE CV2X TRAFFIC

| CCARD-55 | RX_Side (us) downlink | TX_Side (us) uplink |
|---|---|---|
| Avg Latency without RMNET CV2X Traffic Monitor | 809.82105 | 48247.31945 |
| Avg Latency with RMNET CV2X Traffic Monitor | 738.66305 | 39594.01775 |
| Latency Improvements | 71.158 | 8653.3017 |

FIG. 9

| Apps Processor Latency Range (10th Percentile – 90th Percentile) | | | |
|---|---|---|---|
| Scenario | RMNET CV2X Traffic Monitor Enabled (us) | No RMNET CV2X Traffic Monitor (us) | Improvement with RMNET CV2X Traffic Monitor |
| Rx (downlink) | 128.23 – 377.86 [~249] ←— max Jitter | 598.26 – 3626.12 [~3028] ←— max Jitter | Large Latency Reduction with much reduced variation |
| TX (uplink) | 96.15 – 117.19 [~21] ←— max Jitter | 98.43 – 120.07 [~22] ←— max Jitter | Results on Par with Out-of-the-Box Configuration |

FIG. 13

| Apps Processor Latency Range (90th Percentile – 99th Percentile) | | | |
|---|---|---|---|
| Scenario | RMNET CV2X Traffic Monitor Enabled (us) | No RMNET CV2X Traffic Monitor (us) | Improvement with RMNET CV2X Traffic Monitor |
| Rx (downlink) | 377.86 – 3183.72 [~2805] ←— max Jitter | 3626.12 – 4853.71 [~1227] ←— max Jitter base latency is already high | Large Latency Reduction with much reduced variation |
| TX (uplink) | 117.19 – 127.97 [~10] ←— max Jitter | 120.07 – 1975.63 [~1855] ←— max Jitter | Results on Par with Out-of-the-Box Configuration |

FIG. 14

SMART RESOURCE MANAGEMENT FOR LOW LATENCY USE CASE

BACKGROUND

Field of the Disclosure

Aspects of the present disclosure relate to wireless communications, and more particularly, to techniques for managing application processor resources in a cellular vehicle to everything (CV2X) communication system.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., $5^{th}$ generation (5G) NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, the NR supports beamforming, multiple input multiple output (MIMO) antenna technology, and carrier aggregation.

However, as the demand for mobile broadband access continues to increase, there exists a need for further improvements in the NR and the LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include desirable techniques for managing application processor resources in a cellular vehicle to everything (CV2X) communication system to improve CV2X processing latency and jitter.

Certain aspects provide a method for wireless communication performed by an application processor. The method generally includes determining a current status of CV2X traffic and allocating an amount of application processor resources for a CV2X call based on the current status of the CV2X traffic.

Certain aspects provide a method for wireless communication performed by an application processor. The method generally includes determining one or more factors based on which to reserve application processor resources for a CV2X application and reserving the application processor resources for the CV2X application based on the determined one or more factors.

Certain aspects provide an apparatus for wireless communications. The apparatus generally includes an application processor and a memory configured to: determine a current status of CV2X traffic and allocate an amount of application processor resources for a CV2X call based on the current status of the CV2X traffic.

Certain aspects provide an apparatus for wireless communications. The apparatus generally includes an application processor and a memory configured to: determine one or more factors based on which to reserve application processor resources for a CV2X application and reserve the application processor resources for the CV2X application based on the determined one or more factors.

Certain aspects provide an apparatus for wireless communications. The apparatus generally includes means for determining a current status of CV2X traffic and means for allocating an amount of application processor resources for a CV2X call based on the current status of the CV2X traffic.

Certain aspects provide an apparatus for wireless communications. The apparatus generally includes means for determining one or more factors based on which to reserve application processor resources for a CV2X application and means for reserving the application processor resources for the CV2X application based on the determined one or more factors.

Certain aspects provide a computer-readable medium for wireless communications. The computer-readable medium includes instructions that, when executed by a processing system, cause the processing system to perform operations generally including determining a current status of CV2X traffic and allocating an amount of application processor resources for a CV2X call based on the current status of the CV2X traffic.

Certain aspects provide a computer-readable medium for wireless communications. The computer-readable medium includes instructions that, when executed by a processing system, cause the processing system to perform operations generally including determining one or more factors based on which to reserve application processor resources for a CV2X application and reserving the application processor resources for the CV2X application based on the determined one or more factors.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 9 illustrates example latency improvements of an application processor when application processor resources are allocated based on CV2X traffic, in accordance with certain aspects of the present disclosure.

FIGS. 13 and 14 illustrate example latency improvements of an application processor when application processor resources are allocated based on a number of processing cores and a capability of each processing core, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
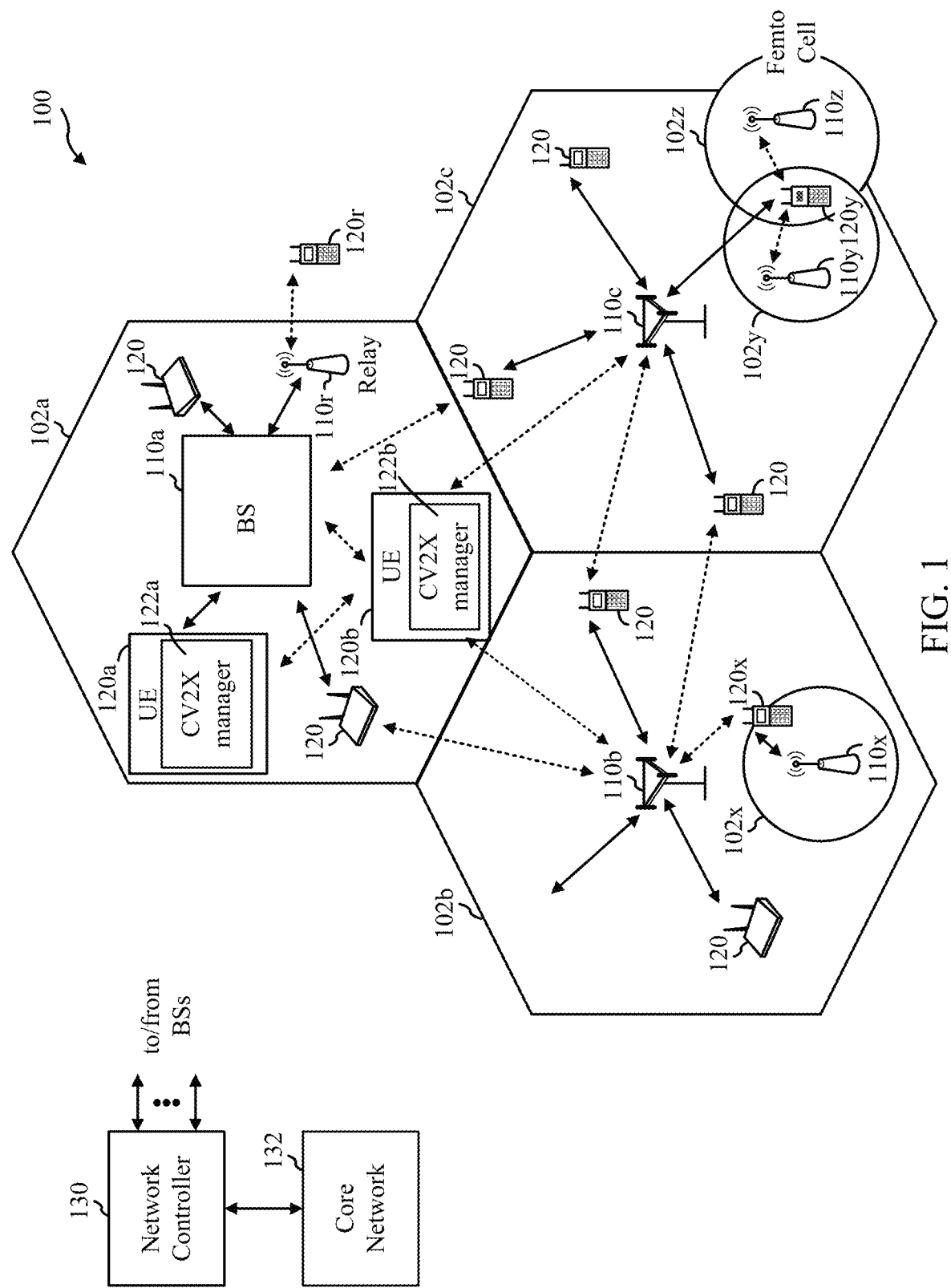
FIG. 1 is a block diagram conceptually illustrating an example wireless communication network, in accordance with certain aspects of the present disclosure.

Aspects of the present disclosure provide apparatus, methods, processing systems, and computer readable mediums for managing application processor resources in a cellular vehicle to everything (CV2X) communication system to improve CV2X processing latency and jitter. In one non-limiting example, the application processor resources are allocated for a cellular vehicle to everything (CV2X) call only during the CV2X call and when there is active CV2X traffic. This will ensure that all the application processor resources are available to other applications when there is no CV2X traffic. In another non-limiting example, the application processor resources are reserved for a CV2X application based on a capability of an application processor (such a number of processing cores of the application processor and a capability of each processing core) and/or processing workload.

The following description provides examples of resource allocation techniques in a CV2X communication system. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from an extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. Multiple input multiple output (MIMO) transmissions with precoding may also be supported. MIMO configurations in a downlink (DL) may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, the wireless communication network 100 may include one or more base stations (BSs) 110 and/or one or more user equipments (UEs) 120. As shown in FIG. 1, a UE 120a includes a CV2X manager 122a and a UE 120b includes a CV2X manager 122b, which may be configured to perform operations 700 of FIG. 7 and 800 of FIG. 8.

The wireless communication network 100 may be a new radio (NR) system (e.g., a $5^{th}$ generation (5G) NR network). As shown in FIG. 1, the wireless communication network 100 may be in communication with a core network 132. The core network 132 may in communication with one or more BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

The BS 110 may provide communication coverage for a particular geographic area, sometimes referred to as a "cell", which may be stationary or may move according to the location of a mobile BS 110. In some examples, multiple BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. The BS 110 may support one or multiple cells.

The BSs 110 communicate with the UEs 120 in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., a relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between the UEs 120, to facilitate communication between wireless devices.

A network controller 130 may be in communication with a set of BSs 110 and provide coordination and control for these BSs 110 (e.g., via a backhaul). In aspects, the network controller 130 may be in communication with the core network 132 (e.g., a 5G core network (5GC)), which provides various network functions such as access and mobility management, session management, user plane function, policy control function, authentication server function, unified data management, application function, network exposure function, network repository function, network slice selection function, etc.

Figure 2:
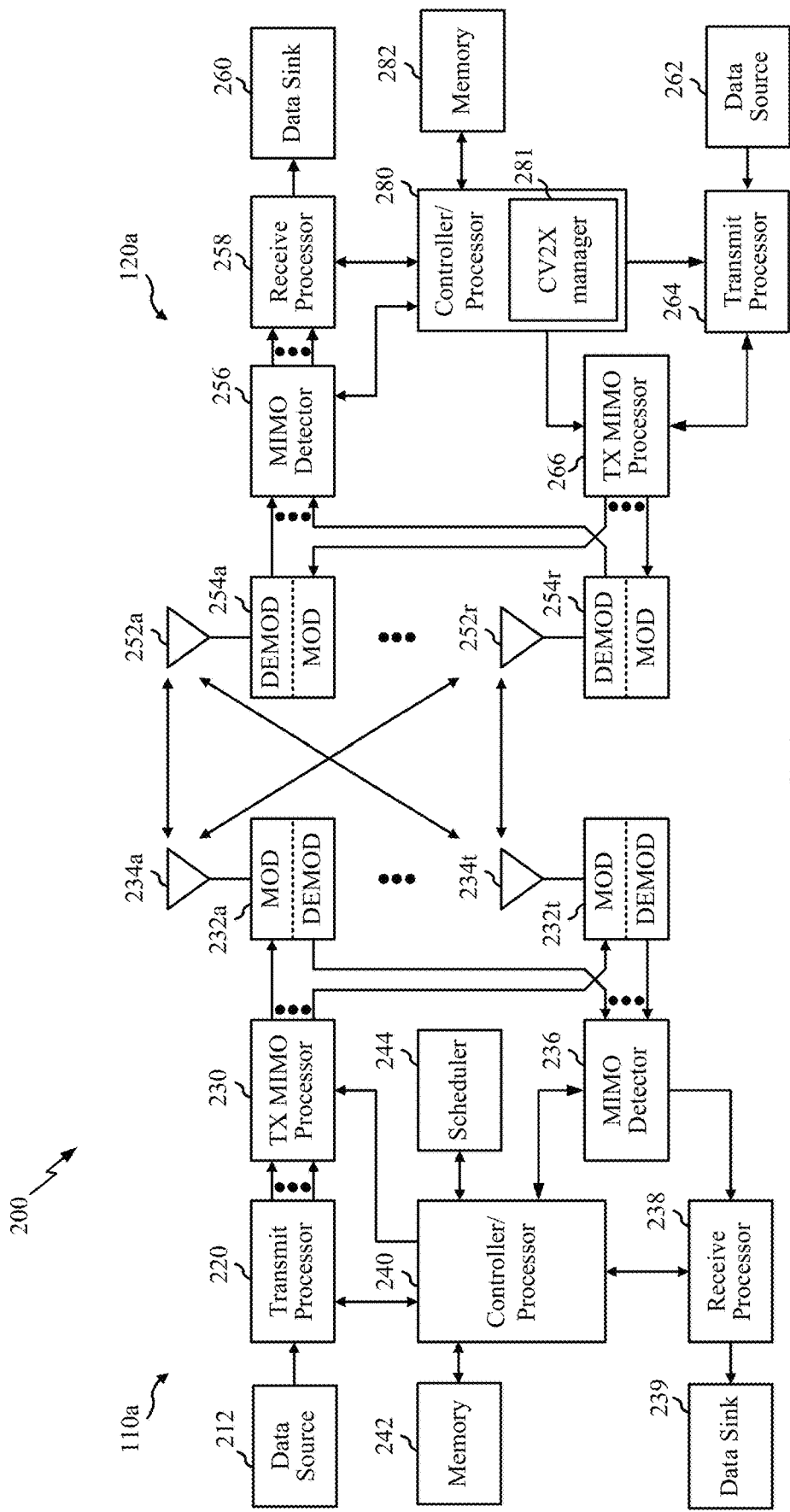
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on data symbols, control symbols, and/or reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a has a CV2X manager 281 that may be configured to perform the operations 700 of FIG. 7 and/or 800 of FIG. 8. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
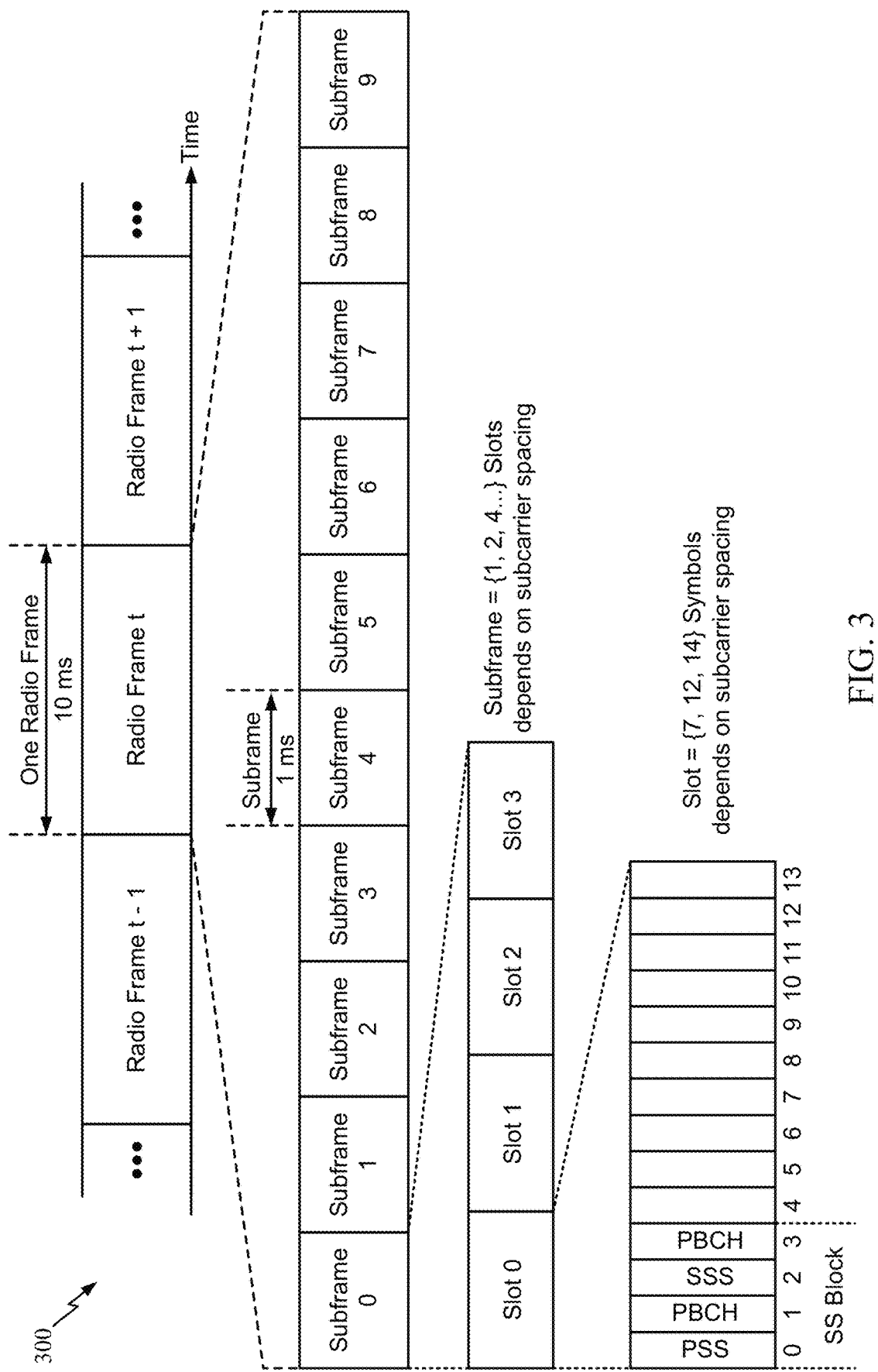
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes.

The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Sidelink Communication

The medium for communication between wireless nodes (such as a user equipment (UE) and a base station (BS)) is often referred to as an access link. The medium for communication between multiple UEs is often referred as sidelink. Real-world applications of sidelink communications may include vehicle-to-vehicle (V2V) communications, internet of everything (IoE) communications, etc.

UEs communicate with each other using sidelink signals. A sidelink signal refers to a signal communicated from one UE (for example, a transmitter UE) to another UE (for example, a receiver UE) without relaying that communication through the BS, even though the BS may be utilized for scheduling and/or control purposes. The sidelink signals are communicated using a licensed spectrum (unlike wireless local area networks that use an unlicensed spectrum). One example of sidelink communication is PC5 as used in the V2V communications.

Sidelink channels are used for sidelink communications. The sidelink channels include a physical sidelink discovery channel (PSDCH), a physical sidelink control channel (PSCCH), a physical sidelink shared channel (PSSCH), and a physical sidelink feedback channel (PSFCH). The PSDCH may carry discovery expressions, which enables proximal UEs to discover each other. The PSCCH may carry control signaling such as sidelink resource configurations and other parameters used for data transmissions. The PSSCH may carry data transmissions. The PSFCH may carry feedback such as channel state information (CSI) related to a sidelink channel quality.

Figure 4B:
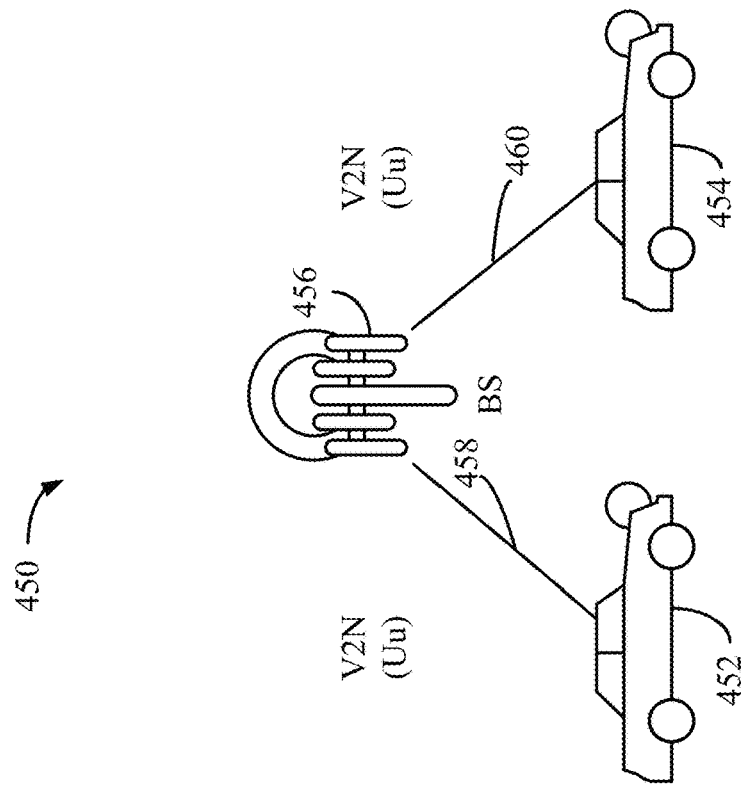
FIGS. 4A and 4B show diagrammatic representations of example vehicle to everything (V2X) systems, in accordance with certain aspects of the present disclosure.
Figure 4A:
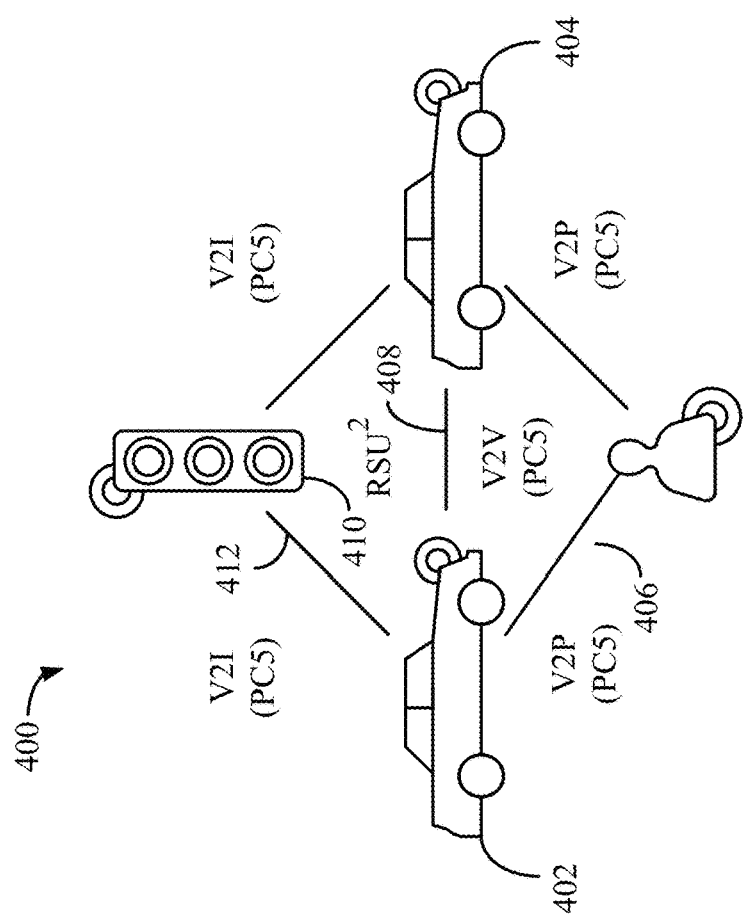

FIG. 4A and FIG. 4B show diagrammatic representations of example vehicle to everything (V2X) systems. Vehicles shown in these V2X systems communicate via sidelink channels.

The V2X systems in FIG. 4A and FIG. 4B provide two complementary transmission modes. A first transmission mode, shown by way of example in FIG. 4A, involves direct communications (for example, also referred to as sidelink communications) between vehicles in proximity to one another in a local area. A second transmission mode, shown by way of example in FIG. 4B, involves network communications through a network, which are implemented over a Uu interface (for example, a wireless communication interface between a radio access network (RAN) and a vehicle).

Referring to FIG. 4A, a V2X system 400 (including V2V communications) is illustrated with two vehicles 402, 404. The first transmission mode allows for a direct communication between different participants in a given geographic location. As illustrated, a vehicle 402 can have a wireless communication link with an individual (e.g., vehicle to pedestrian (V2P) communication) through a PC5 interface 406. Communications between the vehicles 402 and 404 may also occur through a PC5 interface 408. In a like manner, communication may occur from a vehicle 402 to other highway components (for example, a highway component 410), such as a traffic signal or sign (e.g., vehicle to infrastructure (V2I) communication) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system 400 may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as the network entity 456 (e.g., such as the BS 110a of FIG. 1 or FIG. 2), that sends and receives information to and from (for example, relays information between) the vehicles 452, 454. The network communications through vehicle to network (V2N) links 458 and 460 may be used, for example, for long range communications between the vehicles 452, 454, such as for communicating the presence of a car accident a distance ahead along a road or highway. Other types of communications may be sent by the network entity 456 to the vehicles 452, 454, such as traffic flow conditions, road hazard warnings, environmental/weather reports, and service station availability, among other examples. Such data can be obtained from cloud-based sharing services.

Example Cellular Vehicle to Everything (CV2X) Communication System

As noted above, vehicle-to-everything (V2X) communications can be used when a vehicle communicates with one or more entities or devices that may affect the vehicle, and vice versa. The V2X communications may incorporate communications such as cellular vehicle-to-everything (CV2X) communications.

Figure 5:
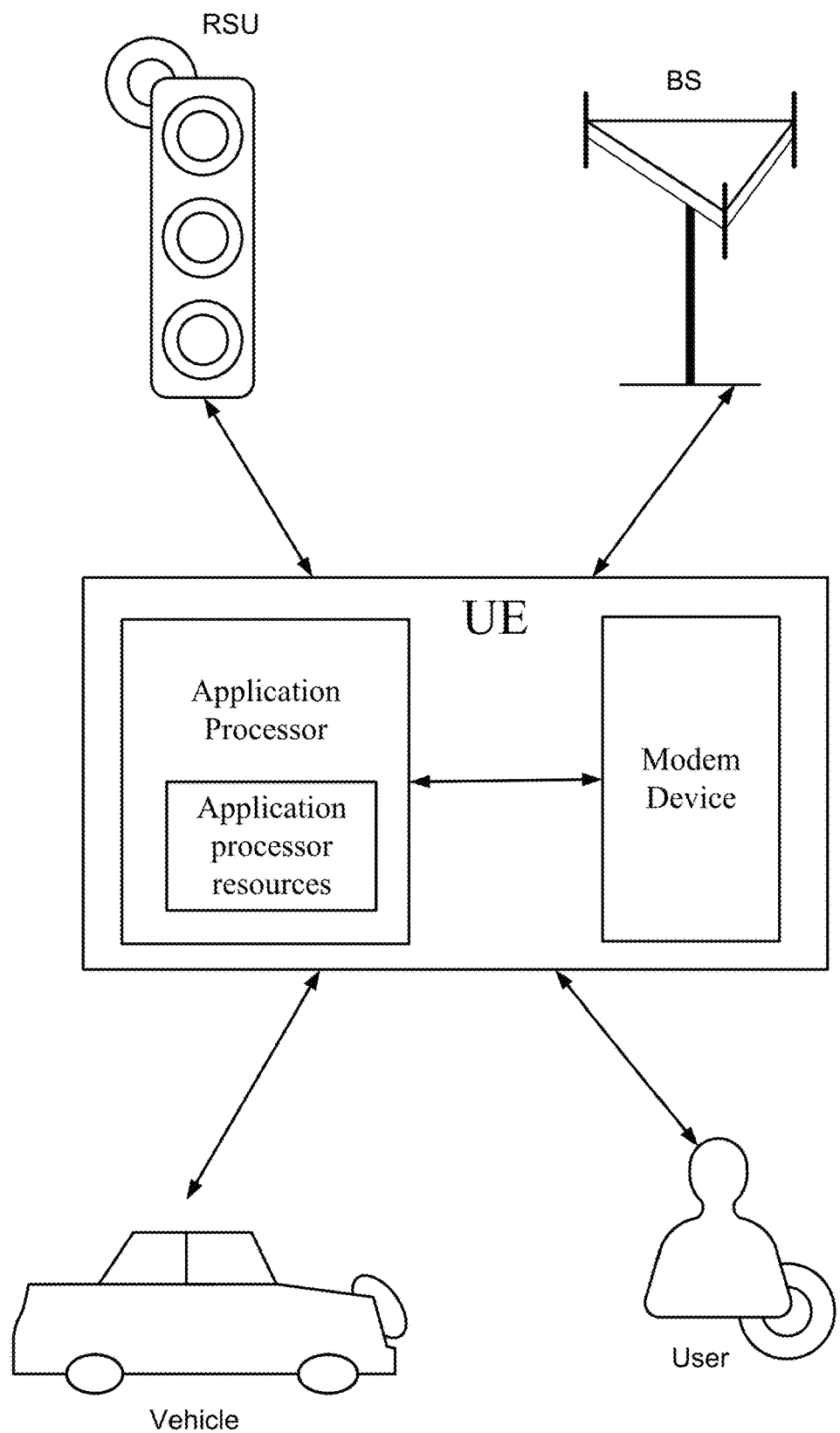
FIG. 5 shows a diagrammatic representation of an example cellular V2X (CV2X) system, in accordance with certain aspects of the present disclosure.

A CV2X communication system may offer vehicles low latency vehicle to vehicle (V2V), vehicle to pedestrian (V2P), vehicle to infrastructure (V2I), and vehicle to network (V2N) communication. For example, as illustrated in FIG. 5, the CV2X communications may occur between a UE (such as a vehicle) and other devices (such as another vehicle, a roadside unit (e.g., a roadside unit associated with a roadside platform), a user (e.g., a user with a mobile phone), and a base station (BS)). The UE may act as either a host device or a client device for the CV2X communications.

The UE includes a modulator-demodulator (modem) device and an application processor with multiple processing cores. The modem device and the application processor communicate with each other. The application processor executes a CV2X application to facilitate the V2X communications with other CV2X devices. A set of application processor resources are available to the application processor to perform these V2X communications. In some cases, the V2X communications among and/or between the CV2X devices may be enabled when the CV2X devices are within a threshold distance that permits communication over a V2X interface or a V2X channel via a communication protocol such as a CV2X communication protocol.

Figure 6:
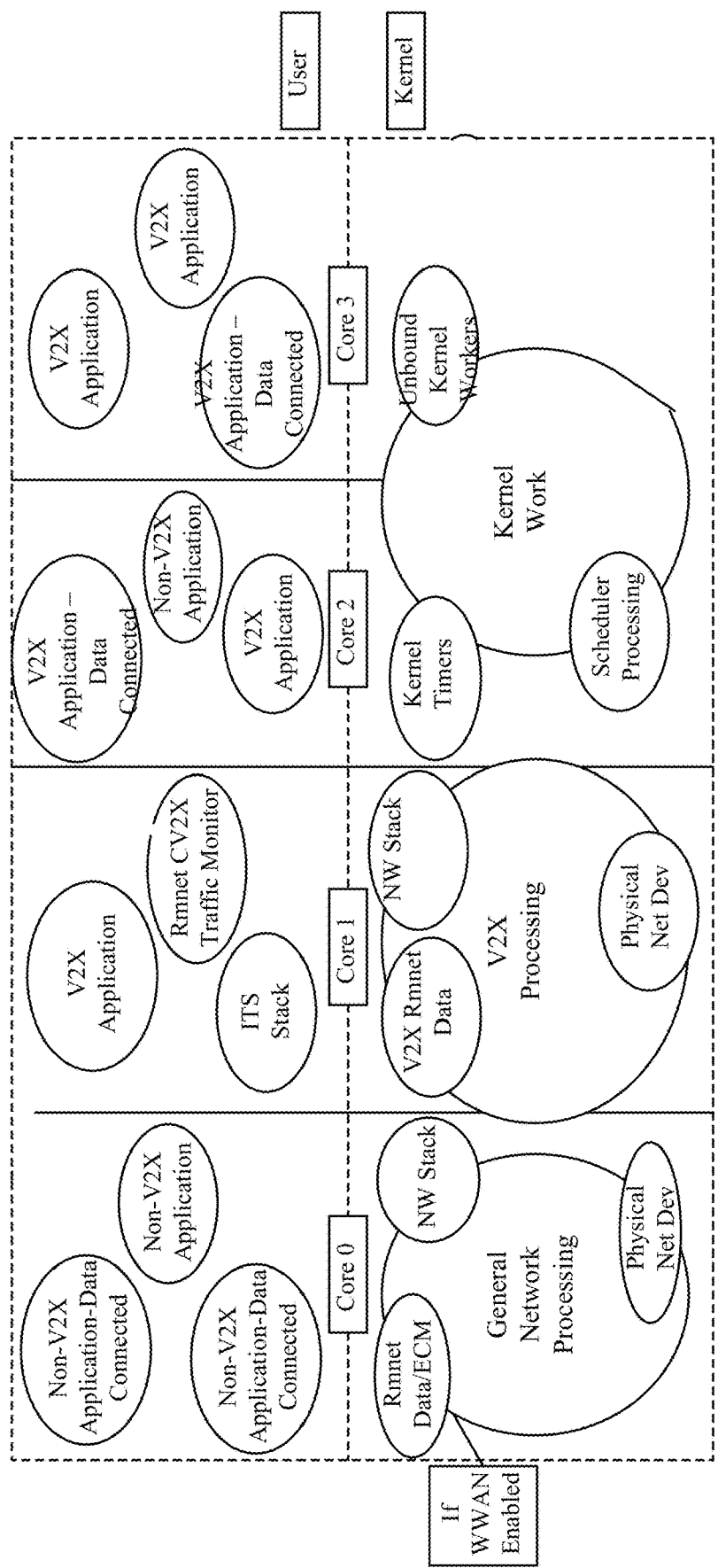
FIG. 6 shows example general resource management architecture of an application processor of a UE, in accordance with certain aspects of the present disclosure.

The CV2X communication system is sensitive to latency and jitter variation. If low latency communication is not achieved between the CV2X devices during operation, it may result in a potential safety issue. In some cases, such as during concurrent scenarios (e.g., concurrent cellular traffic (CV2X and non-CV2X) processing, concurrent processing due to non-cellular traffic, etc.), it is not always possible to meet the low latency requirements. For example, as illustrated in FIG. 6, when multiple processing cores of the application processor support simultaneous processing of CV2X and other non-V2X applications, it results in resource sharing conflict, which causes the latency and jitter variation. Accordingly, in certain cases, the processing of the CV2X application may be delayed as application processor resources may not be available.

To ensure that the application processor does not delay the processing of the CV2X application, the application processor resources for the CV2X application processing must be reserved. However, as the CV2X application processing workload may vary, it is essential to find right amount of reserved application processing resources to meet the CV2X application processing workload, and not starve other non-V2X applications from the application processing resources.

Example Smart Resource Management in CV2X System

Aspects of the present disclosure relate to a resource allocation technique in a cellular vehicle to everything (CV2X) communication system. The resource allocation technique may be implemented, for example, by a UE to in an effort to appropriately allocate application processor resources for CV2X communications based on CV2X traffic and/or application processor capability, to improve CV2X processing latency and jitter. The resource allocation technique described herein will also ensure that the application processor resources are made available to other non-V2X applications when there is no CV2X traffic.

Figure 7:
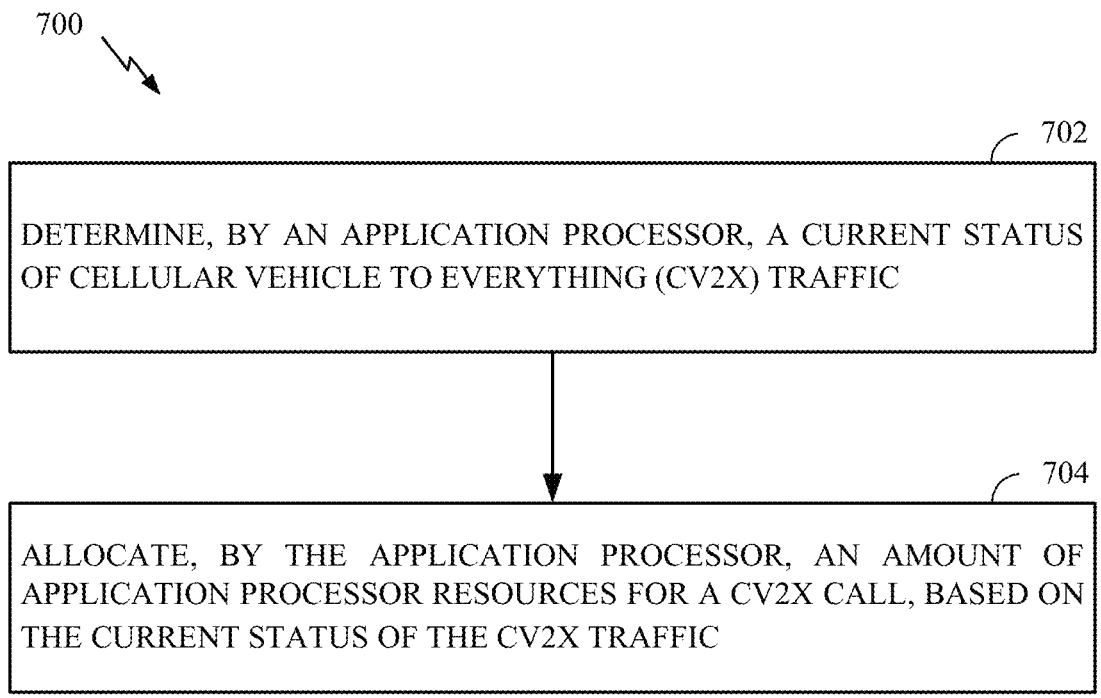
FIG. 7 is a flow diagram illustrating example application processor resource allocation operations for wireless communication by an application processor, in accordance with certain aspects of the present disclosure.

FIG. 7 is a flow diagram illustrating example operations 700 for wireless communication, in accordance with certain aspects of the present disclosure. The operations 700 may be performed, for example, by (an application processor of) a UE (e.g., such as the UE 120a and/or the UE 120b in the wireless communication network 100 of FIG. 1). The operations 700 may be implemented as software components that are executed and run on one or more processors (e.g., the controller/processor 280 of FIG. 2). Further, transmission and reception of signals by the application processor of the UE in operations 700 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 700 begin, at 702, by determining a current status of CV2X traffic. For example, the UE may determine the current status of the CV2X traffic using the controller/processor 280 shown in FIG. 2 and/or of the apparatus shown in FIG. 15.

At 704, the UE allocates an amount of application processor resources for a CV2X call based on the current status of the CV2X traffic. For example, the UE may allocate the application processor resources using the controller/processor 280 shown in FIG. 2 and/or of the apparatus shown in FIG. 15.

In certain aspects, the allocation of the application processor resources includes reserving the application processor resources for the CV2X call when the CV2X traffic is active and releasing the reserved application processor resources when there is no CV2X traffic.

In certain aspects, the application processor determines the current status of the CV2X traffic based on tracking of the CV2X traffic. In some cases, the reserved application processor resources are released when there is no CV2X traffic for a configurable time period based on the tracking.

In certain aspects, the application processor determines the current status of the CV2X traffic based on an indication received from a modulator-demodulator (modem) device. The indication is received periodically. In some cases, the reserved application processor resources are released when the indication indicates no CV2X traffic.

The operations shown in FIG. 7 are further described with reference to FIGS. 8A-9.

Figure 8A:
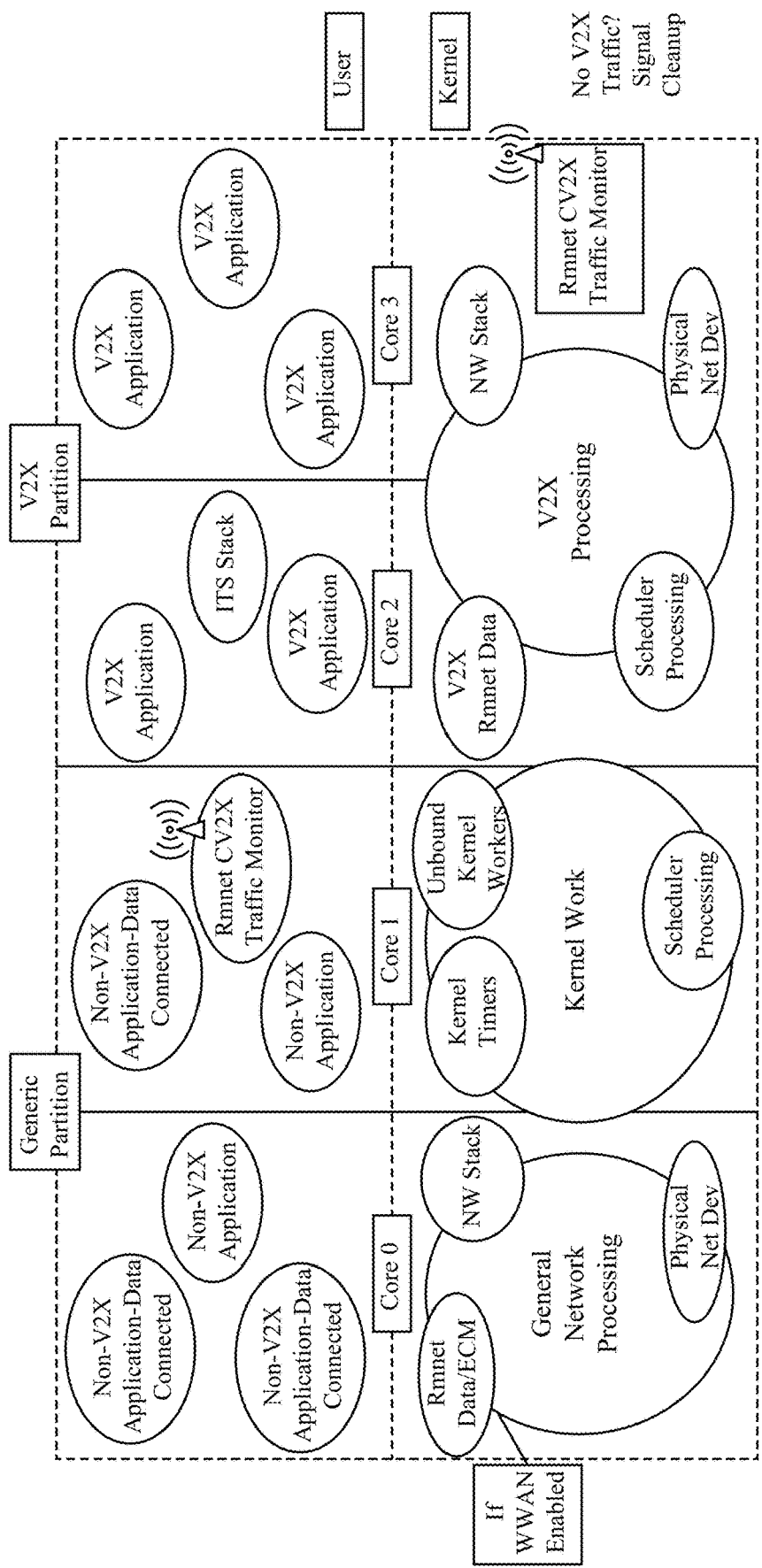
FIG. 8A shows example resource management architecture of an application processor of a UE based on CV2X traffic, in accordance with certain aspects of the present disclosure.
Figure 8B:
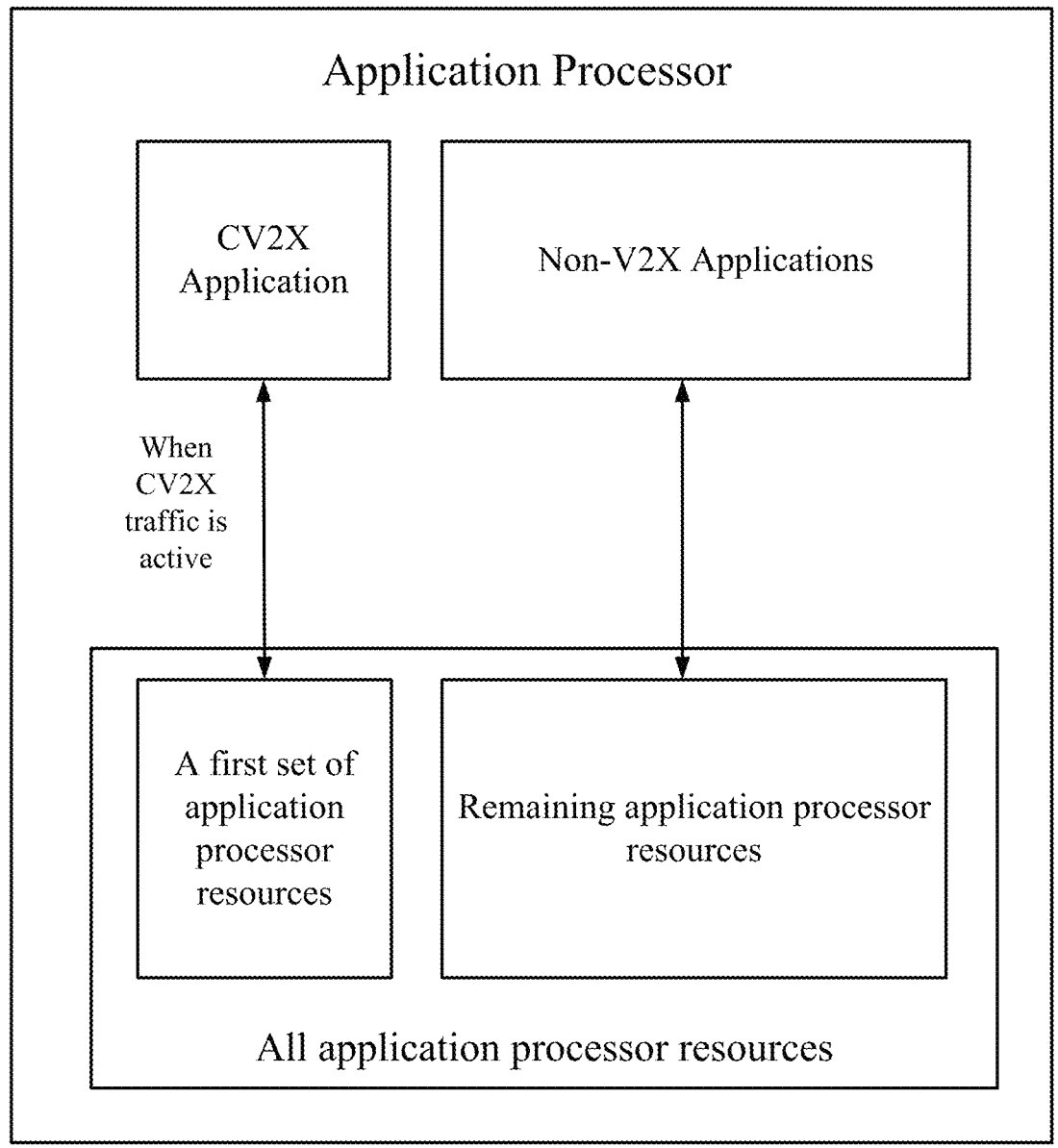
FIG. 8B illustrates example application processor resource allocation when CV2X traffic is active, in accordance with certain aspects of the present disclosure.

In certain aspects, as illustrated in FIGS. 8A and 8B, during a CV2X call and when there is active CV2X traffic, a first set of application processor resources (from all application processor resources) are reserved for a CV2X application and remaining application processor resources are reserved for other non-V2X applications. One or more processing cores of an application processor (e.g., core 2 and core 3) uses the first set of application processor resources to process the CV2X traffic.

Figure 8C:
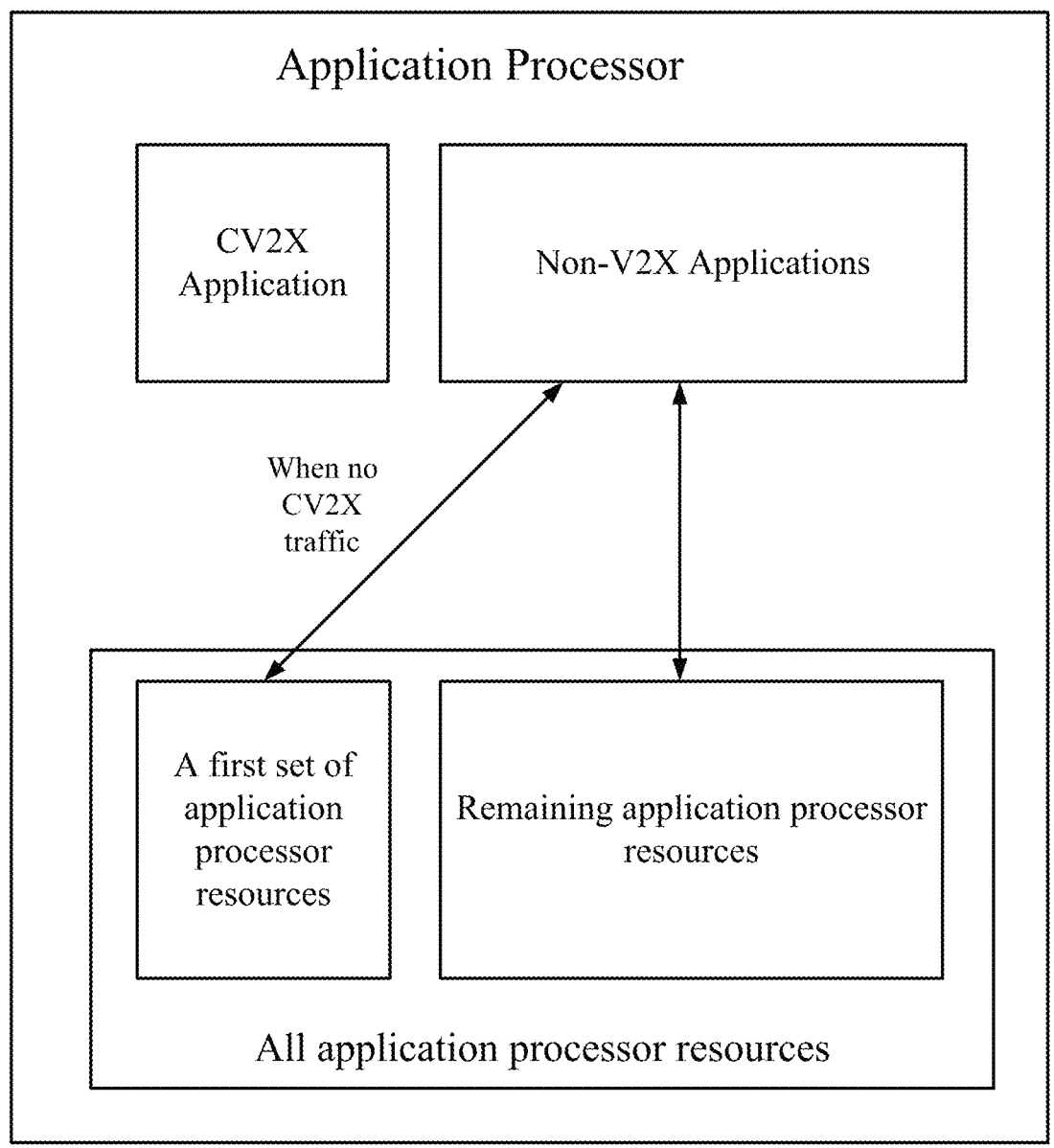
FIG. 8C illustrates example application processor resource allocation when there is no CV2X traffic, in accordance with certain aspects of the present disclosure.

In certain aspects, when there is no CV2X traffic, as illustrated in FIG. 8C, the first set of application processor resources are released and made available for the other non-V2X applications. The application processor then uses both the first set of application processor resources and the remaining application processor resources to process the other non-V2X applications. In one example, the application processor includes a tracking process that tracks ongoing CV2X traffic. When the application processor, based on the tracking process, does not see any CV2X traffic for a configurable time period (e.g., 1 second), the first set of application processor resources are released and made available for the other non-V2X applications. In another example, a modem device monitors radio resources (e.g., the first set of application processor resources) reserved for the CV2X application. The modem periodically (or based on an event) sends an indication to the application processor using a control path. Based on this indication, the reserved application processor resources may be released and made available for the other non-V2X applications.

In certain aspects, a low latency is achieved when application processor resources are allocated based on CV2X traffic. As illustrated in FIG. 9, when a CV2X application has concurrency with other non-V2X applications and there is no wireless wide area network (WWAN) traffic, an average latency value for receiving and sending data packets by the CV2X application is low when the application processor resources are allocated for the CV2X application based on the CV2X traffic.

Figure 10:
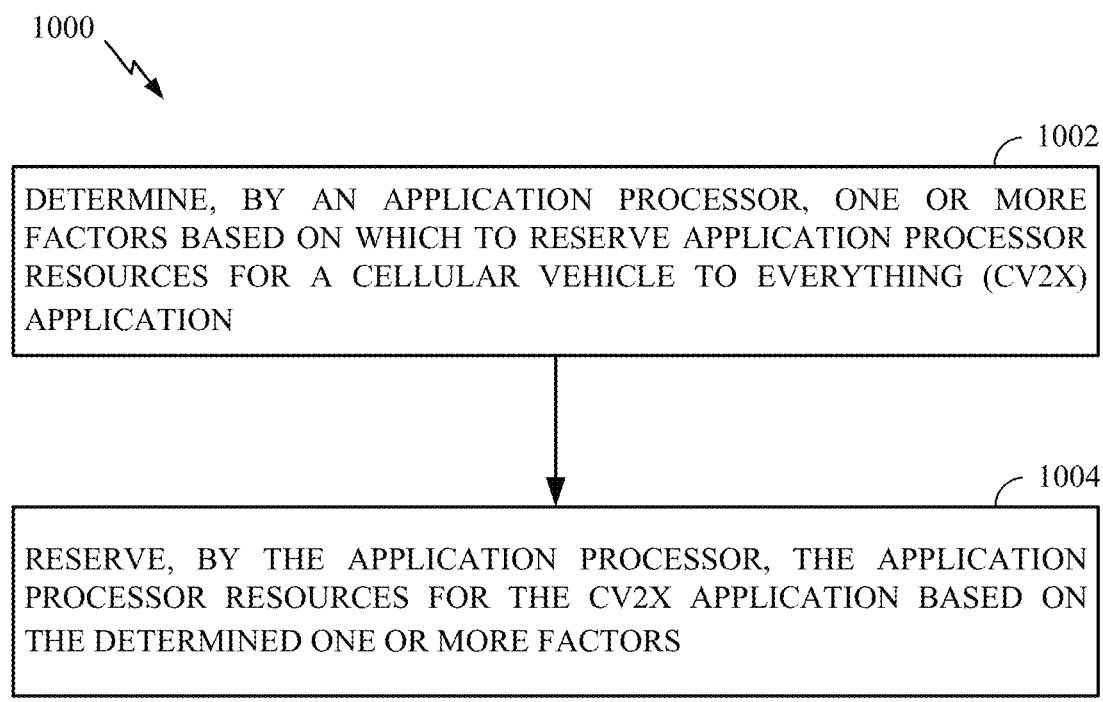
FIG. 10 is a flow diagram illustrating example application processor resources reservation operations for wireless communication by an application processor, in accordance with certain aspects of the present disclosure.

FIG. 10 is a flow diagram illustrating example operations 1000 for wireless communication, in accordance with certain aspects of the present disclosure. The operations 1000 may be performed, for example, by (an application processor of) a UE (e.g., such as the UE 120a and/or the UE 120b in the wireless communication network 100 of FIG. 1). The operations 1000 may be implemented as software components that are executed and run on one or more processors (e.g., the controller/processor 280 of FIG. 2). Further, transmission and reception of signals by the application processor of the UE in operations 1000 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 1000 begin, at 1002, by determining one or more factors based on which to reserve application processor resources for a CV2X application. For example, the UE may determine the one or more factors using the controller/processor 280 shown in FIG. 2 and/or of the apparatus shown in FIG. 16.

At 1004, the UE reserves the application processor resources for the CV2X application based on the determined one or more factors. For example, the UE may reserve the application processor resources using the controller/processor 280 shown in FIG. 2 and/or of the apparatus shown in FIG. 16.

In certain aspects, the one or more factors involve a current status of CV2X traffic. The reservation of the application processor resources for the CV2X application based on the determined one or more factors includes allocating an amount of the application processor resources for a CV2X call based on the current status of the CV2X traffic. The allocation of the application processor resources includes reserving the application processor resources for the CV2X call when the CV2X traffic is active and releasing the reserved application processor resources when there is no CV2X traffic.

In certain aspects, the one or more factors involve a number of processing cores of the application processor and/or a capability of each processing core of the application processor.

In certain aspects, the one or more factors involve an amount of processing workload required by the CV2X application for required actions. In some cases, the amount of processing workload required by the CV2X application for the required actions is determined via an application programming interface (API).

In certain aspects, the one or more factors involve transmission packet rate from the application processor to UEs.

In certain aspects, the one or more factors involve an indication of an incoming data packet rate from one or more UEs (that are capable of sending CV2X traffic). In one example, the indication is received periodically. In another example, the indication is received when there is an increase in incoming data packets from the one or more UEs. In another example, the indication is received via a control path or a packet header.

In certain aspects, a minimum number of application processor resources required for a CV2X application is determined (and then reserved) based on a processing workload by the CV2X application for required actions and/or a number of packets to be processed by the CV2X application.

In some cases, the processing workload is determined via an API. For example, the API may allow the CV2X application to provide the required processing workload. Since there are multiple CV2X application implementations and the processing workload may vary, the API is used to tailor the required processing workload based on different CV2X application implementations.

In some cases, a transmitter load of the CV2X application may be fixed, however a receiver load of the CV2X application may vary based on how many UEs/CV2X devices are sending the CV2X traffic. A modem device periodically (or based on events such as increase in number of received packets from the CV2X devices) may indicate the application processor about an incoming packet rate from the CV2X devices. The modem device sends this indication using a control path or a packet header. When the packet header is used to send this indication, the packet header will be stripped in the application processor to determine the incoming packet rate. The incoming packet rate is used to determine an approximate number of packets to be processed by the CV2X application.

The operations shown in FIG. 10 are further described with reference to FIGS. 11-14.

Figure 11:
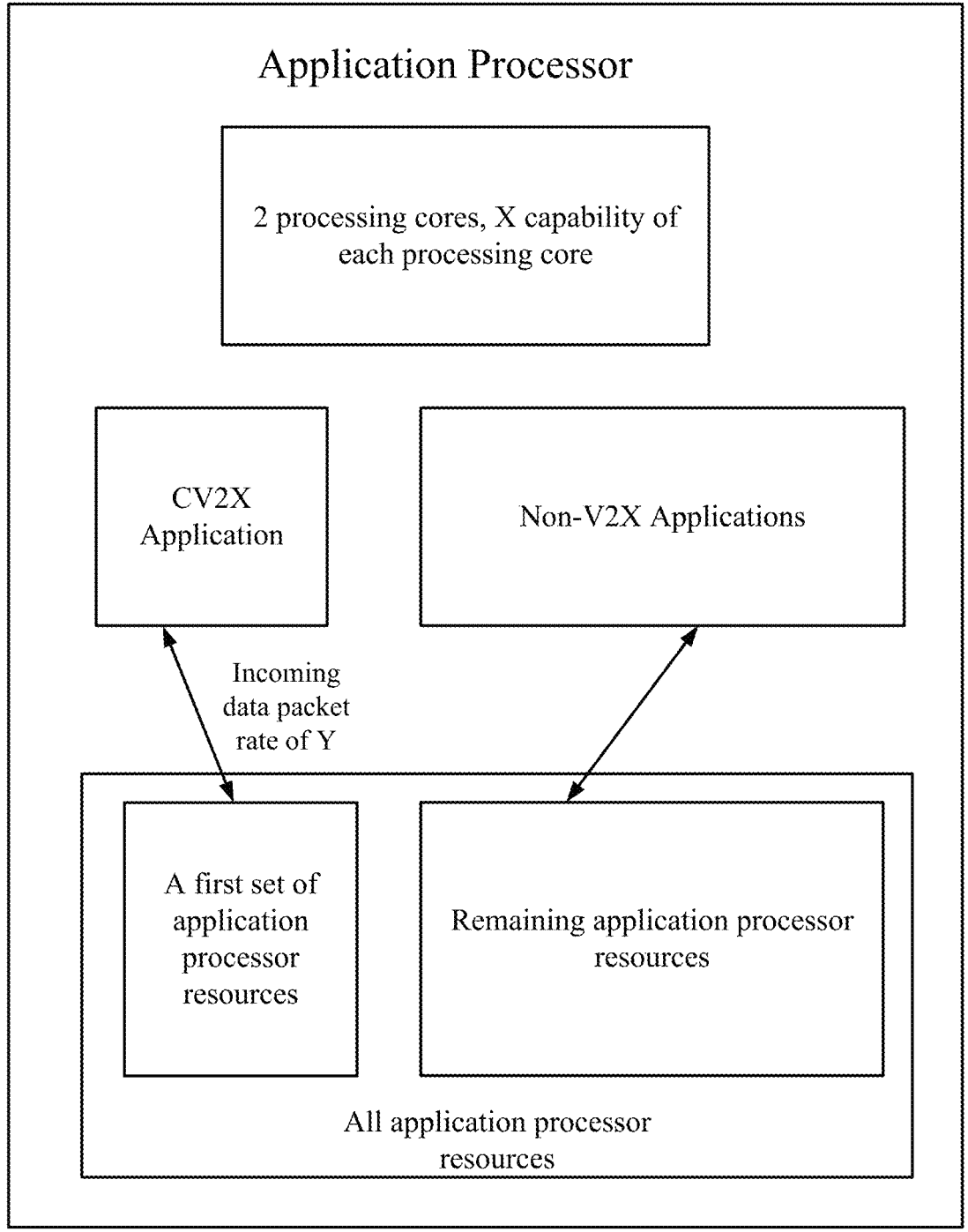
FIG. 11 illustrates example application processor resource allocation when an application processor has two processing cores, in accordance with certain aspects of the present disclosure.

As illustrated in FIG. 11, a first set of application processor resources (e.g., 30% of all application processor resources) are reserved for a CV2X application to process CV2X traffic, and remaining application processor resources are reserved for other non-V2X applications. The first set of application processor resources are determined and reserved based on a number of processing cores (e.g., two processing cores) of an application processor, a capability of each of these two processing cores (e.g., X capability of each processing core), and/or incoming data packet rate (of Y) from multiple CV2X devices (e.g., 2 UEs) sending CV2X traffic.

Figure 12:
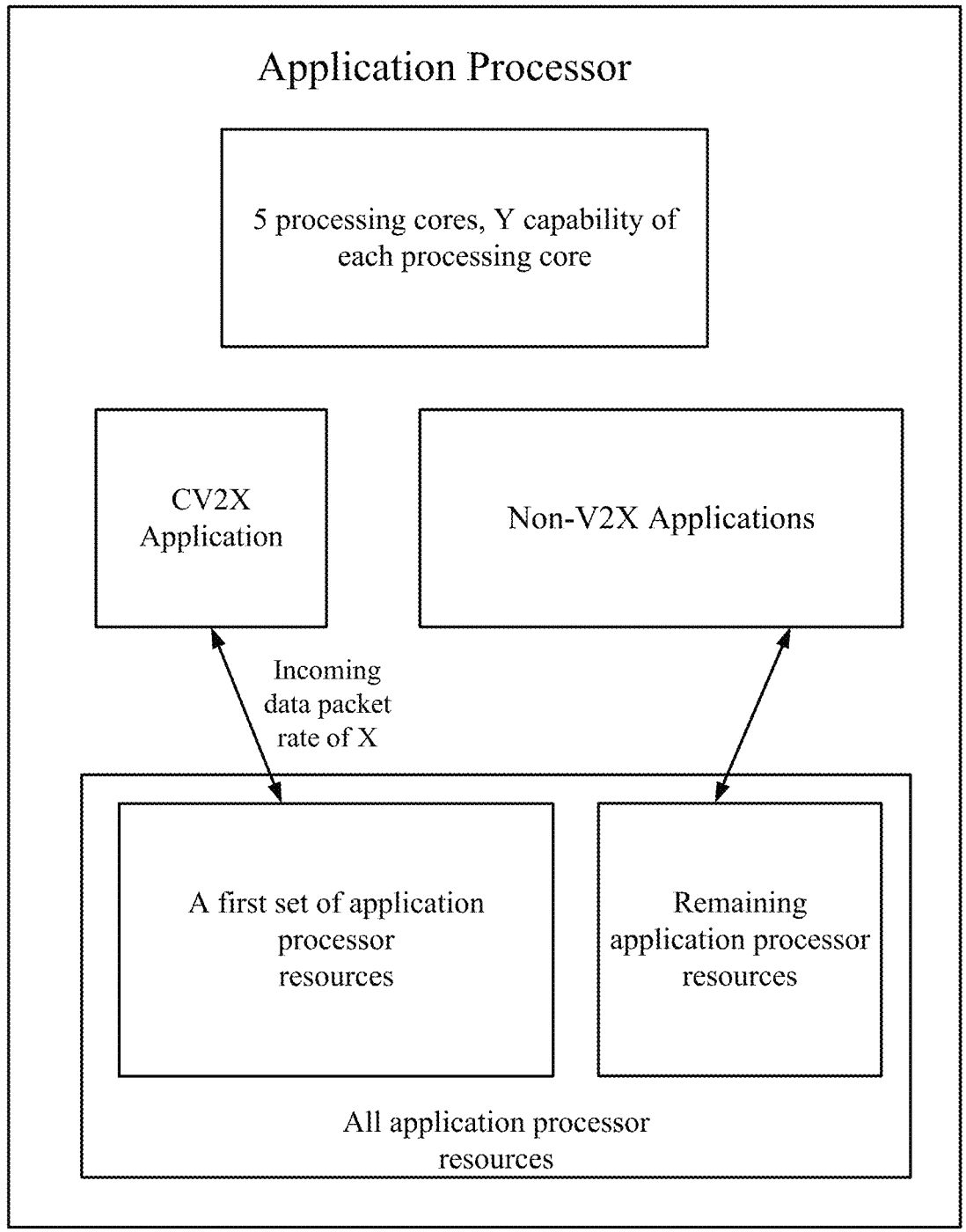
FIG. 12 illustrates example application processor resource allocation when an application processor has five processing cores, in accordance with certain aspects of the present disclosure.

As illustrated in FIG. 12, a first set of application processor resources (e.g., 60% of all application processor resources) are reserved for a CV2X application to process CV2X traffic, and remaining application processor resources are reserved for other non-V2X applications. The first set of application processor resources are determined and reserved based on a number of processing cores (e.g., five processing cores) of an application processor, a capability of each of these two processing cores (e.g., Y capability of each processing core), and/or incoming data packet rate (of X) from multiple CV2X devices (e.g., 4 UEs) sending CV2X traffic.

In certain aspects, a low latency and jitter is achieved when application processor resources are allocated based on a capability of an application processor, an incoming data packet rate, etc. As illustrated in FIGS. 13 and 14, when a CV2X application has concurrency with other cellular traffic, latency and jitter value for receiving and sending data packets by the CV2X application is low when the application processor resources are allocated for the CV2X application based on the capability of the application processor, the incoming data packet rate, etc.

Example Wireless Communication Devices

Figure 15:
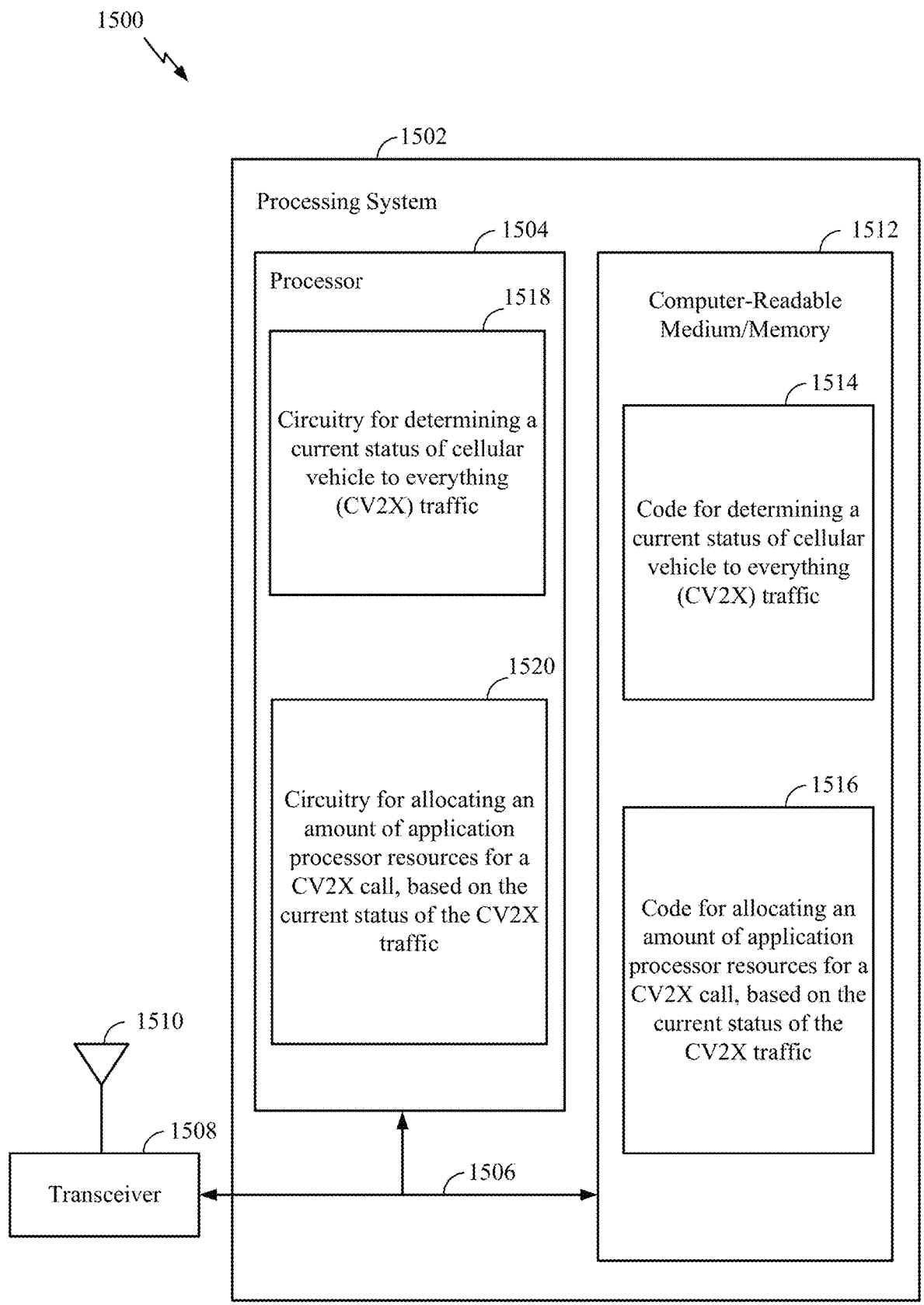
FIG. 15 illustrates a communications device that may include various components configured to perform operations (e.g., application processor resource allocation operations) for techniques disclosed herein, in accordance with certain aspects of the present disclosure.

FIG. 15 illustrates a communications device 1500 that may include various components (e.g., corresponding to means-plus-function components) configured to perform operations for the techniques disclosed herein, such as the operations illustrated in FIG. 7. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 is configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 7, or other operations for performing the various techniques discussed herein. In certain aspects, computer-readable medium/memory 1512 stores code 1514 for determining and code 1516 for allocating. The code 1514 for determining may include code for determining a current status of CV2X traffic. The code 1516 for allocating may include code for allocating an amount of application processor resources for a CV2X call, based on the current status of the CV2X traffic.

The processor 1514 may include circuitry configured to implement the code stored in the computer-readable medium/memory 1512, such as for performing the operations illustrated in FIG. 7, as well as other operations for performing the various techniques discussed herein. For example, the processor 1504 includes circuitry 1518 for determining and circuitry 1520 for allocating. The circuitry 1518 for determining may include circuitry for determining a current status of CV2X traffic. The circuitry 1520 for allocating may include circuitry for allocating an amount of application processor resources for a CV2X call, based on the current status of the CV2X traffic.

Figure 16:
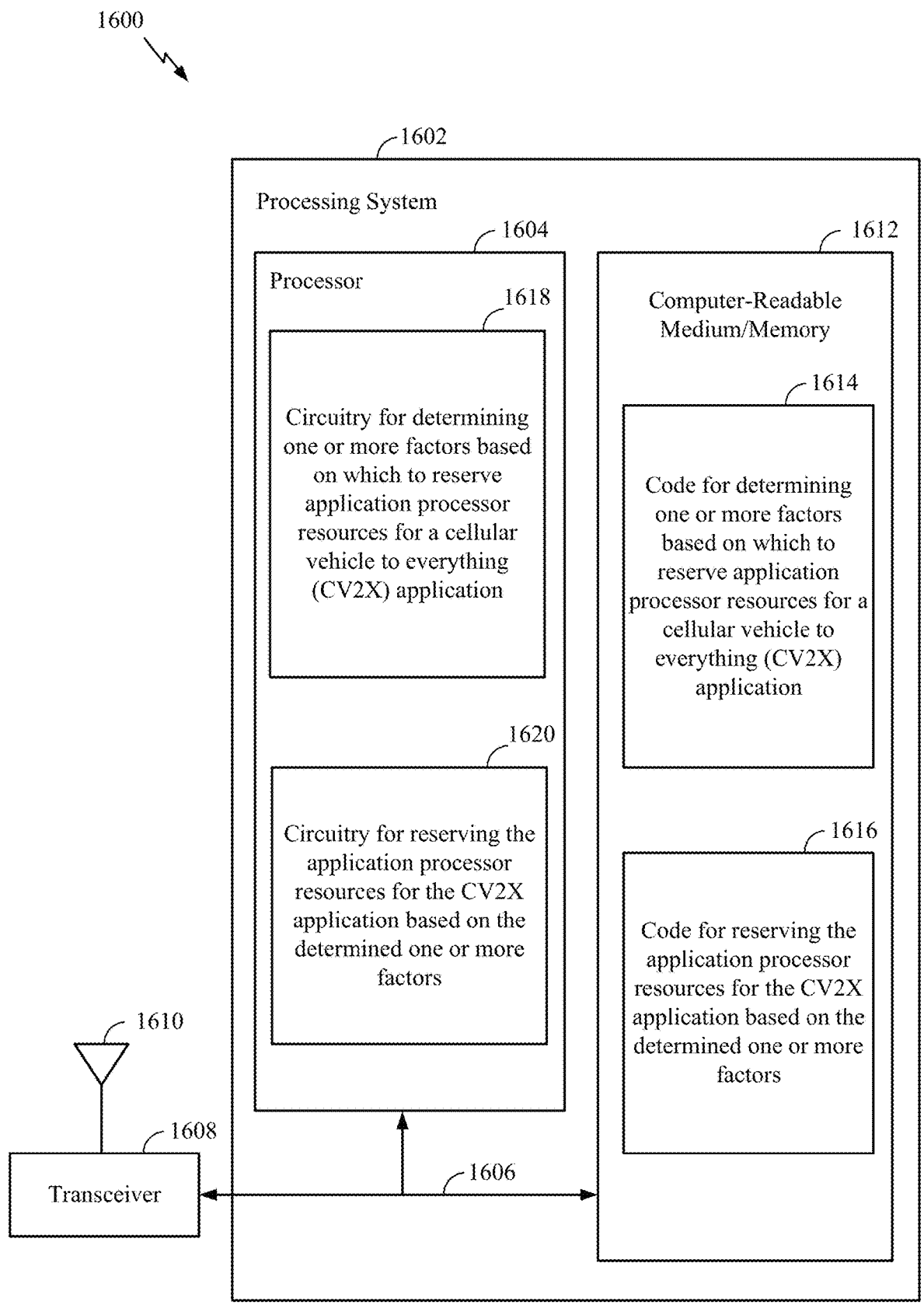
FIG. 16 illustrates a communications device that may include various components configured to perform operations (e.g., application processor resources reservation operations) for techniques disclosed herein, in accordance with certain aspects of the present disclosure.

FIG. 16 illustrates a communications device 1600 that may include various components (e.g., corresponding to means-plus-function components) configured to perform operations for the techniques disclosed herein, such as the operations illustrated in FIG. 10. The communications device 1600 includes a processing system 1602 coupled to a transceiver 1608 (e.g., a transmitter and/or a receiver). The transceiver 1608 is configured to transmit and receive signals for the communications device 1600 via an antenna 1610, such as the various signals as described herein. The processing system 1602 is configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 10, or other operations for performing the various techniques discussed herein. In certain aspects, computer-readable medium/memory 1612 stores code 1614 for determining and code 1616 for reserving. The code 1614 for determining may include code for determining one or more factors based on which to reserve application processor resources for a CV2X application. The code 1616 for reserving may include code for reserving the application processor resources for the CV2X application based on the determined one or more factors.

The processor 1614 may include circuitry configured to implement the code stored in the computer-readable medium/memory 1612, such as for performing the operations illustrated in FIG. 10, as well as other operations for performing the various techniques discussed herein. For example, the processor 1604 includes circuitry 1618 for determining and circuitry 1620 for reserving. The circuitry 1618 for determining may include circuitry for determining one or more factors based on which to reserve application processor resources for a CV2X application. The circuitry 1620 for reserving may include circuitry for reserving the application processor resources for the CV2X application based on the determined one or more factors.

Example Aspects

Implementation examples are described in the following numbered clauses:

In a first aspect, a method for wireless communications by an application processor, comprising: determining a current status of cellular vehicle to everything (CV2X) traffic; and allocating an amount of application processor resources for a CV2X call, based on the current status of the CV2X traffic.

In a second aspect, alone or in combination with the first aspect, the allocating comprises: reserving the application processor resources for the CV2X call when the CV2X traffic is active; and releasing the reserved application processor resources when there is no CV2X traffic.

In a third aspect, alone or in combination with one or more of the first and second aspects, the current status of the CV2X traffic is determined based on tracking of the CV2X traffic.

In a fourth aspect, alone or in combination with one or more of the first through third aspects, the allocating comprises: releasing the reserved application processor resources when there is no CV2X traffic for a configurable time period based on the tracking.

In a fifth aspect, alone or in combination with one or more of the first through fourth aspects, the current status of the CV2X traffic is determined based on an indication received from a modulator-demodulator (modem) device.

In a sixth aspect, alone or in combination with one or more of the first through fifth aspects, the allocating comprises: releasing the reserved application processor resources based on the indication indicating no CV2X traffic.

In a seventh aspect, alone or in combination with one or more of the first through sixth aspects, the indication is received periodically.

In an eighth aspect, a method for wireless communications by an application processor, comprising: determining one or more factors based on which to reserve application processor resources for a cellular vehicle to everything (CV2X) application; and reserving the application processor resources for the CV2X application based on the determined one or more factors.

In a ninth aspect, alone or in combination with the eighth aspect, the one or more factors involve a current status of CV2X traffic; and reserving the application processor resources for the CV2X application based on the determined one or more factors comprises allocating an amount of the application processor resources for a CV2X call, based on the current status of the CV2X traffic.

In a tenth aspect, alone or in combination with one or more of the eighth and ninth aspects, the allocating comprises: reserving the application processor resources for the CV2X call when the CV2X traffic is active; and releasing the reserved application processor resources when there is no CV2X traffic.

In an eleventh aspect, alone or in combination with one or more of the eighth through tenth aspects, the one or more factors involve at least one of: a number or a capability of processing cores of the application processor.

In a twelfth aspect, alone or in combination with one or more of the eighth through eleventh aspects, the one or more factors involve an amount of processing workload required by the CV2X application for required actions.

In a thirteenth aspect, alone or in combination with one or more of the eighth through twelfth aspects, determining the amount of processing workload required by the CV2X application for the required actions via an application programming interface (API).

In a fourteenth aspect, alone or in combination with one or more of the eighth through thirteenth aspects, the one or more factors involve user equipments (UEs) transmission packet rate from the application processor.

In a fifteenth aspect, alone or in combination with one or more of the eighth through fourteenth aspects, the one or more factors involve an indication of an incoming data packet rate from one or more user equipments (UEs).

In a sixteenth aspect, alone or in combination with one or more of the eighth through fifteenth aspects, the indication is received periodically.

In a seventeenth aspect, alone or in combination with one or more of the eighth through sixteenth aspects, the indication is received when there is an increase in incoming data packets from the one or more UEs.

In an eighteenth aspect, alone or in combination with one or more of the eighth through seventeenth aspects, the indication is received via a control path or a packet header.

An apparatus for wireless communication, comprising at least one processor; and a memory coupled to the at least one processor, the memory comprising code executable by the at least one processor to cause the apparatus to perform the method of any of the first through eighteenth aspects.

An apparatus comprising means for performing the method of any of the first through eighteenth aspects.

A computer readable medium storing computer executable code thereon for wireless communications that, when executed by at least one processor, cause an apparatus to perform the method of any of the first through eighteenth aspects.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or BS as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or BS can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. A method for wireless communications by an application processor of a user equipment (UE), comprising:
   determining a current status of cellular vehicle to everything (CV2X) traffic corresponding to a flow of data on a CV2X application running on the UE; and
   allocating an amount of application processor resources for a CV2X call, wherein the allocating comprises reserving the application processor resources for the CV2X call during the CV2X call when the CV2X traffic is determined to be active based on the current status of the CV2X traffic and releasing all the application processor resources that have been reserved when the determination is that there is no CV2X traffic for a configurable time period.

2. The method of claim 1, wherein the current status of the CV2X traffic is determined based on tracking of the CV2X traffic.

3. The method of claim 2, wherein the allocating comprises:
   releasing the application processor resources that have been reserved when there is no CV2X traffic for the configurable time period based on the tracking.

4. The method of claim 1, wherein the current status of the CV2X traffic is determined based on an indication received from a modulator-demodulator (modem) device.

5. The method of claim 4, wherein the allocating comprises:
   releasing the application processor resources that have been reserved based on the indication indicating no CV2X traffic.

6. The method of claim 4, wherein the indication is received periodically.

7. A method for wireless communications by an application processor of a user equipment (UE), comprising:
   determining one or more factors on which to base reserving application processor resources for a cellular vehicle to everything (CV2X) call, wherein the one or more factors involve a current status of CV2X traffic corresponding to a flow of data on a CV2X application running on the UE; and
   reserving the application processor resources for the CV2X call during the CV2X call when the CV2X traffic is determined to be active based on the determined one or more factors, wherein the reserving further comprises releasing all the application processor resources that have been reserved when no CV2X traffic for a configurable time period is determined based on the determined one or more factors.

8. The method of claim 7, further comprising reserving the application processor resources for the CV2X call based on the determined one or more factors comprises allocating an amount of the application processor resources for the CV2X call, based on the current status of the CV2X traffic.

9. The method of claim 7, wherein the one or more factors on which to base reserving the application processor resources for the CV2X application involve at least one of: a number or a capability of processing cores of the application processor.

10. The method of claim 7, wherein the one or more factors on which to base reserving the application processor resources for the CV2X application involve an amount of processing workload required by the CV2X application for required actions.

11. The method of claim 10, further comprising determining the amount of processing workload required by the CV2X application for the required actions via an application programming interface (API).

12. The method of claim 7, wherein the one or more factors on which to base reserving the application processor resources for the CV2X application involve user equipments (UEs) transmission packet rate from the application processor.

13. The method of claim 7, wherein the one or more factors on which to base reserving the application processor resources for the CV2X application involve an indication of an incoming data packet rate from one or more user equipments (UEs).

14. The method of claim 13, wherein the indication is received periodically.

15. The method of claim 13, wherein the indication is received when there is an increase in incoming data packets from the one or more UEs.

16. The method of claim 13, wherein the indication is received via a control path or a packet header.

17. A user equipment (UE) for wireless communications, comprising a memory comprising instructions, and one or more processors configured, individually or collectively, to execute the instructions and cause the UE to:

determine a current status of cellular vehicle to everything (CV2X) traffic corresponding to a flow of data on a CV2X application running on the UE; and allocate an amount of application processor resources for a CV2X call, wherein the allocation comprises reserving the application processor resources for the CV2X call during the CV2X call when the CV2X traffic is determined to be active based on the current status of the CV2X traffic and releasing all the application processor resources that have been reserved when the determination is that there is no CV2X traffic for a configurable time period.

18. The UE of claim 17, wherein the current status of the CV2X traffic is determined based on tracking of the CV2X traffic.

19. The UE of claim 18, wherein the one or more processors are configured, individually or collectively, to execute the instructions and further cause the UE to:

release the application processor resources that have been reserved when there is no CV2X traffic for the configurable time period based on the tracking.

20. The UE of claim 17, wherein the current status of the CV2X traffic is determined based on an indication received from a modulator-demodulator (modem) device.

21. The UE of claim 20, wherein the one or more processors are configured, individually or collectively, to execute the instructions and further cause the UE to:

release the application processor resources that have been reserved based on the indication indicating no CV2X traffic.

22. The UE of claim 20, wherein the indication is received periodically.

23. A user equipment (UE) for wireless communications, comprising a memory comprising instructions, and one or more processors configured, individually or collectively, to execute the instructions and cause the UE to:

determine one or more factors on which to base reserving application processor resources for a cellular vehicle to everything (CV2X) call, wherein the one or more factors involve a current status of CV2X traffic corresponding to a flow of data on a CV2X application running on the UE; and reserve the application processor resources for the CV2X call during the CV2X call when the CV2X traffic is determined to be active based on the determined one or more factors, and release all the application processor resources that have been reserved when no CV2X traffic for a configurable time period is determined based on the determined one or more factors.

24. The UE of claim 23, wherein the one or more processors are configured, individually or collectively, to execute the instructions and further cause the UE to:

reserve the application processor resources for the CV2X call based on the determined one or more factors comprises allocating an amount of the application processor resources for a CV2X call, based on the current status of the CV2X traffic.

25. The apparatus of claim 23, wherein the one or more factors on which to base reserving the application processor resources for the CV2X application involve at least one of: a number or a capability of processing cores of the application processor.

26. The apparatus of claim 23, wherein the one or more factors on which to base reserving the application processor resources for the CV2X application involve an amount of processing workload required by the CV2X application for required actions.

\* \* \* \* \*